United States Patent
Tamayo et al.

(10) Patent No.: US 12,487,674 B1
(45) Date of Patent: Dec. 2, 2025

(54) RESPONSIVE DIGITAL MESSAGING WITH INTEGRATED DETECTION FOR ADAPTIVE DISPLAYS

(71) Applicant: Capital One Services, LLC, McLean, VA (US)

(72) Inventors: Bryan Tamayo, Allen, TX (US); William Merkel, Garland, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/975,057

(22) Filed: Dec. 10, 2024

(51) Int. Cl.
*G06F 3/01* (2006.01)

(52) U.S. Cl.
CPC .................................. *G06F 3/013* (2013.01)

(58) Field of Classification Search
CPC .. G06F 3/013; G06F 3/04812; G06F 3/04815; G06F 3/04845; G06F 3/0304; G06F 3/147; G06F 3/011; H04N 13/368; G02B 2027/0141; G06T 2219/024; G06T 19/006; H04M 3/567; G09F 27/00; G09F 3/147; G09F 3/011; G09G 2354/00
See application file for complete search history.

(56) References Cited

U.S. PATENT DOCUMENTS

| | | | |
|---|---|---|---|
| 2009/0322678 A1* | 12/2009 | Lashina | G06Q 30/02 345/158 |
| 2017/0075420 A1* | 3/2017 | Yu | G06F 3/0482 |
| 2017/0090566 A1* | 3/2017 | George-Svahn | G06F 3/04883 |
| 2021/0286502 A1* | 9/2021 | Lemay | G06F 3/04845 |

* cited by examiner

*Primary Examiner* — Abhishek Sarma
(74) *Attorney, Agent, or Firm* — Harrity & Harrity, LLP

(57) ABSTRACT

In some implementations, a system may receive, from at least one detection component, position data associated with a user. The system may obtain a set of display elements associated with the display. The system may obtain decision information defining one or more conditions for selecting one or more display elements from the set of display elements associated with the display. The system may select one or more display elements from the set of display elements based on the decision information, wherein the selected one or more display elements include at least one content asset and at least one display adaptation. The system may provide a set of instructions and the selected one or more display elements to the display.

20 Claims, 8 Drawing Sheets

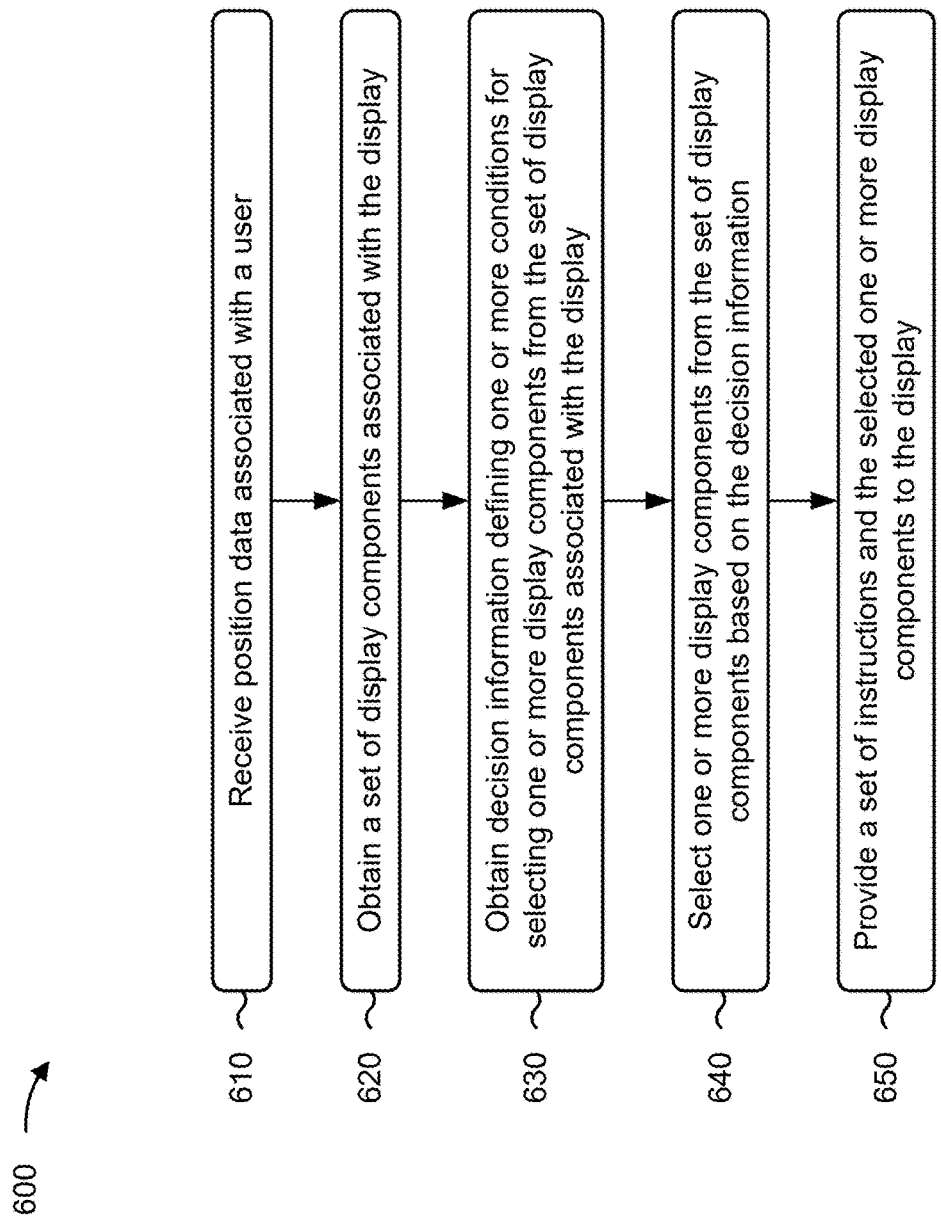

RESPONSIVE DIGITAL MESSAGING WITH INTEGRATED DETECTION FOR ADAPTIVE DISPLAYS

BACKGROUND

Digital displays are screens or panels that show visual information in the form of text, images, and/or videos. Digital displays may be used in a wide variety of devices, including televisions, smartphones, projectors, and other electronic systems. Digital displays may use electronic components to generate and control the display output. The content of a digital display may be controlled by digital signals, which may be received from various sources, such as a computer, server, controller, or the like. The digital display may include a processor, memory, driver, controller, or the like to manage the digital signals and translate the digital signals into a digital output.

SUMMARY

In some implementations, a system for responsive digital messaging with integrated detection for adaptive displays includes one or more memories; and one or more processors, communicatively coupled to the one or more memories, configured to: receive position data associated with a user, wherein the position data includes proximity data associated with a distance between the user and a display; obtain a set of display elements associated with the display; obtain decision information defining one or more conditions for selecting one or more display elements from the set of display elements associated with the display, wherein the decision information is associated with the position data and includes at least one proximity data threshold for selecting the one or more display elements from the set of display elements; select one or more display elements from the set of display elements based on the decision information, wherein the selected one or more display elements include at least one content asset and at least one display adaptation; and provide a set of instructions and the selected one or more display elements to the display, wherein the set of instructions includes instructions for displaying the at least one content asset and applying the at least one display adaptation in order to alter the at least one content asset based on the position data.

In some implementations, a method for responsive digital messaging with integrated detection for adaptive displays includes receiving, from at least one detection component, position data associated with a user, wherein the position data includes proximity data associated with a distance between the user and a display; obtaining a set of display elements associated with the display; obtaining decision information defining one or more conditions for selecting one or more display elements from the set of display elements associated with the display, wherein the decision information is associated with the position data and includes at least one proximity data threshold for selecting the one or more display elements from the set of display elements; selecting one or more display elements from the set of display elements based on the decision information, wherein the selected one or more display elements include at least one content asset and at least one display adaptation; and providing a set of instructions and the selected one or more display elements to the display, wherein the set of instructions includes instructions for displaying the at least one content asset and applying the at least one display adaptation in order to alter the at least one content asset based on the position data.

In some implementations, a non-transitory computer-readable medium storing a set of instructions includes one or more instructions that, when executed by one or more processors of a system, cause the system to: receive position data associated with a user, wherein the position data includes eye detection information and proximity data associated with a distance between the user and a display; obtain a set of display elements associated with the display; obtain decision information defining one or more conditions for selecting one or more display elements from the set of display elements associated with the display, wherein the decision information is associated with the position data and includes at least one proximity data threshold and at least one eye detection information threshold for selecting the one or more display elements from the set of display elements; select one or more display elements from the set of display elements based on the decision information, wherein the selected one or more display elements include at least one content asset and at least one display adaptation; and provide a set of instructions and the selected one or more display elements to the display, wherein the set of instructions includes instructions for displaying the at least one content asset and applying the at least one display adaptation in order to alter the at least one content asset based on the position data.

BRIEF DESCRIPTION OF THE DRAWINGS

FIG. 6 is a flowchart of an example process associated with responsive digital messaging with integrated detection for adaptive displays, in accordance with some embodiments of the present disclosure.

DETAILED DESCRIPTION

Figure 1A:
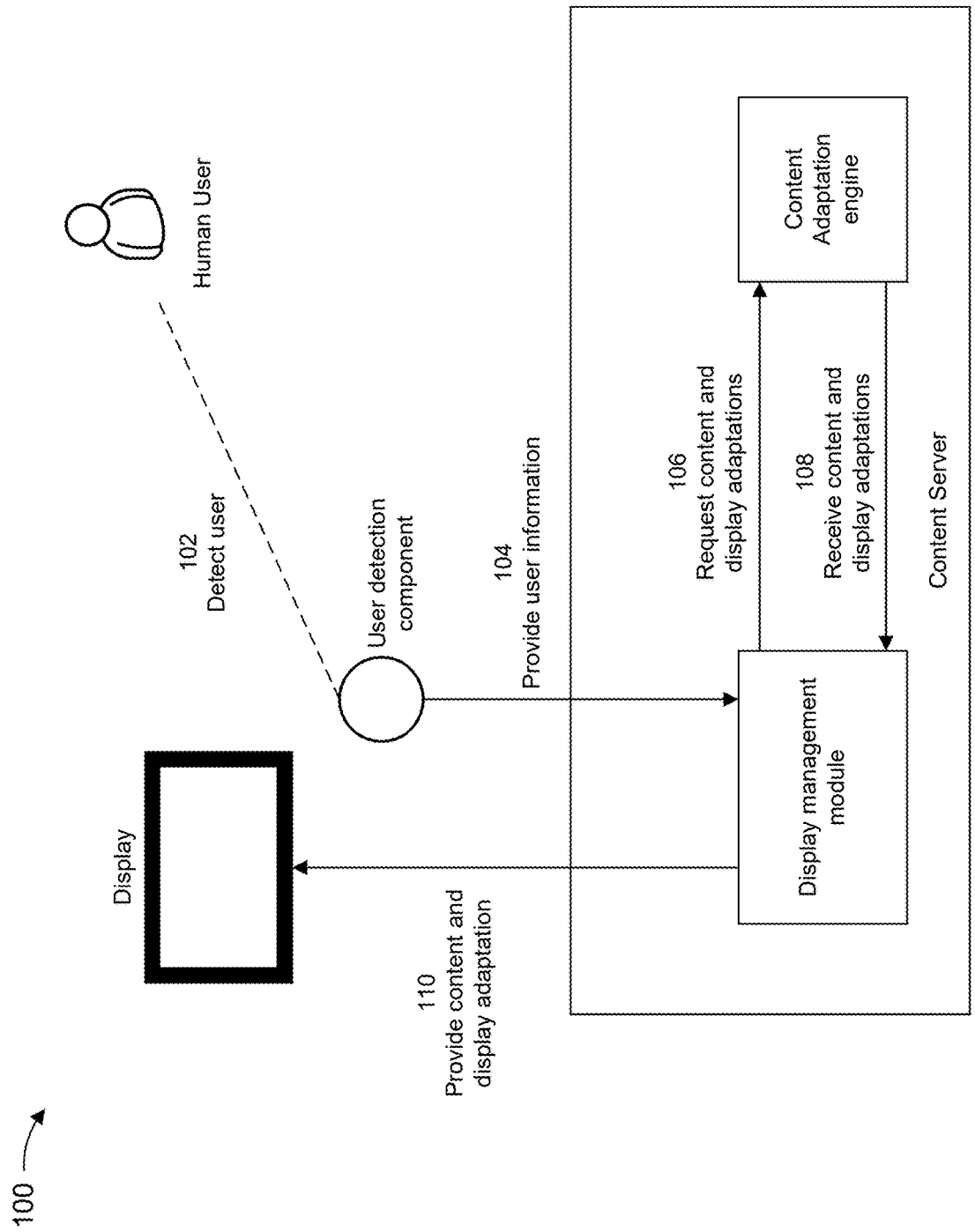
FIGS. 1A-1C are diagrams of one or more examples associated with responsive digital messaging with integrated detection for adaptive displays, in accordance with some embodiments of the present disclosure.

The following detailed description of example implementations refers to the accompanying drawings. The same reference numbers in different drawings may identify the same or similar elements.

Digital displays may show visual information in the form of text, images, or video using digital technology and electronic components to generate and control the display output. For example, some digital displays may be capable of displaying static images, video, scrolling text, interactive content, and/or touch-sensitive interfaces, among other examples. In some cases, digital displays may be used as digital signs in public information displays, wayfinding systems, or event-specific displays, among other examples, in places such as event and/or conference centers, workplaces, shopping centers, airports, sports venues, or the like. The text, images, or other content presented on a digital display may be controlled by digital signals from various sources, including computers, video players, servers, and/or controllers, among other examples.

However, digital displays that show static, generic, and/or pre-configured content tend to be inefficient and ineffective, because the digital displays may provide content that is not relevant to a user, is not engaging to a user, and/or is not legible or perceptible to users at varying distances from the display. For example, a user may have difficulty reading or deciphering displayed content when the user is located relatively far from the display. Furthermore, when a user is relatively near a digital display, the user may be interested in detailed messaging associated with the displayed content. However, for displays with static, generic, and/or pre-configured content, the content and associated formatting may be intended for users located outside a particular distance from the display, resulting in content that may lack sufficient details to retain user interest as the distance between the user and the display changes. Similarly, although displays can show dynamic content (e.g., weather, news, or the like), the content may not be tailored and/or formatted to certain users and/or to users located at various distances from the display. Additionally, static displays and/or non-personalized content provide limited opportunities for tracking audience interaction with the displayed content, thereby making it difficult to improve or optimize the displayed content. Additionally, the use of static and/or non-personalized content may lead to unnecessary energy consumption by the display, where content that is not tailored to an audience may be used inefficiently (e.g., displaying content when there are no users looking at the display).

Some implementations described herein enable responsive digital messaging with integrated user detection for adaptive displays. For example, digital messaging may be adapted to a detected distance of a user from a display and/or to an identification of a user. In some implementations, a system may receive user position information, obtain display elements, obtain decision information defining conditions for displaying one or more of the display elements, select one or more display elements based on the decision information, and provide the selected display elements to a display. In some implementations, the system may provide instructions associated with the display elements for displaying content assets and applying display adaptations to the content assets. In some implementations, the position information may include user identification data, biometric engagement data (e.g., gaze tracking data, face detection data, or the like), and/or biometric identification data associated with the user that may be utilized in obtaining decision information. Additionally, the system may track the user based on the received position data in order to generate vector data (e.g., path data, movement data, behavior data, or the like) that may be utilized to obtain decision information. Furthermore, the system may receive user identification associated with the user and/or may receive user appearance data to determine a user profile (e.g., including historical information associated with the user) for the user, where the user profile may be associated with the decision information for selecting the display elements. Additionally, the system may receive user device identification data for a user device associated with the user to determine a user profile associated with the user, where the user profile may be associated with the decision information for selecting display elements to show on the display and/or on the user device. Furthermore, one or more digital displays may adapt content and/or content formatting based on a movement path of a user relative to the one or more digital displays.

In this way, digital messaging may deliver content that may be personalized to a user and may be formatted to the user based on a distance between the user and the display. Similarly, content shown on a display may be updated based on the determined, detected, and/or known identity of a user, thereby enabling content and/or content formatting that is customized to the user. For example, content and content formatting (e.g., sizing, typography, resolution, color, or the like) may be dynamically updated based on the distance between the user and the display, thereby providing content with increased relevance and an increased probability of user engagement. Additionally, by identifying a user device associated with a user, the system may provide dynamic, personalized content and/or content formatting to the user via the digital display and/or via the user device. Furthermore, by providing biometric detection and/or biometric engagement information, the system may adapt content and/or content formatting to a user that is viewing content on the display. Additionally, by adapting content and/or content formatting on one or more displays based on a movement path of a user, each display may provide unique (e.g., not previously provided) content to the user at different points along the movement path. Similarly, a display may show recommendations to visit additional display locations, where the additional displays may continue the communication and/or interaction from the original display.

Additionally, a dynamic system that customizes the content and/or formatting on the display may optimize content delivery based on data associated with the user. For example, the display system may adjust content resolution, brightness, or layout of a display based on the user and/or the environment, increasing the efficiency of resource utilization, reducing power consumption, and optimizing display performance. Similarly, a dynamic system that personalizes the content and/or or formatting may selectively render only the most relevant portions of a page or application instead of updating or refreshing the entire screen, thereby reducing processing usage. Additionally, the display may turn off and/or hibernate screen content or background processes in response to certain users, users that are not viewing the content, and/or users located at or beyond a threshold distance from the display, thereby reducing power usage and/or wireless network traffic. Furthermore, a dynamic system that customizes the content and/or formatting on the display may reduce network traffic by adjusting the type and amount of data transferred based on the user and/or user behavior. For example, instead of downloading large media files that may be intended for a large audience, the system can prioritize smaller, more relevant content. Similarly, the system can cache frequently used or relevant content locally, thereby avoiding repeatedly fetching the content from the network and reducing the need for constant data requests.

Figure 1B:
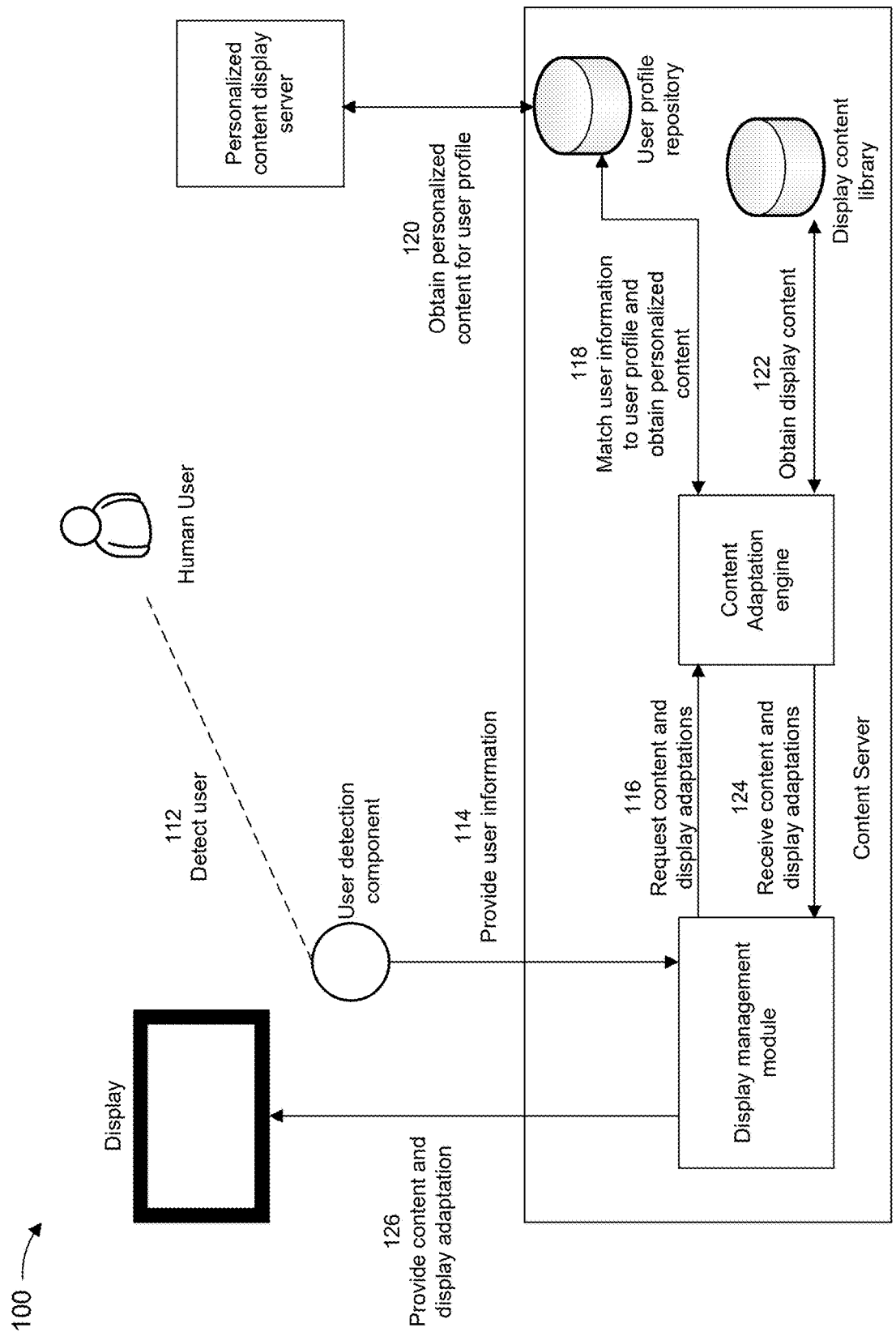
Figure 1C:
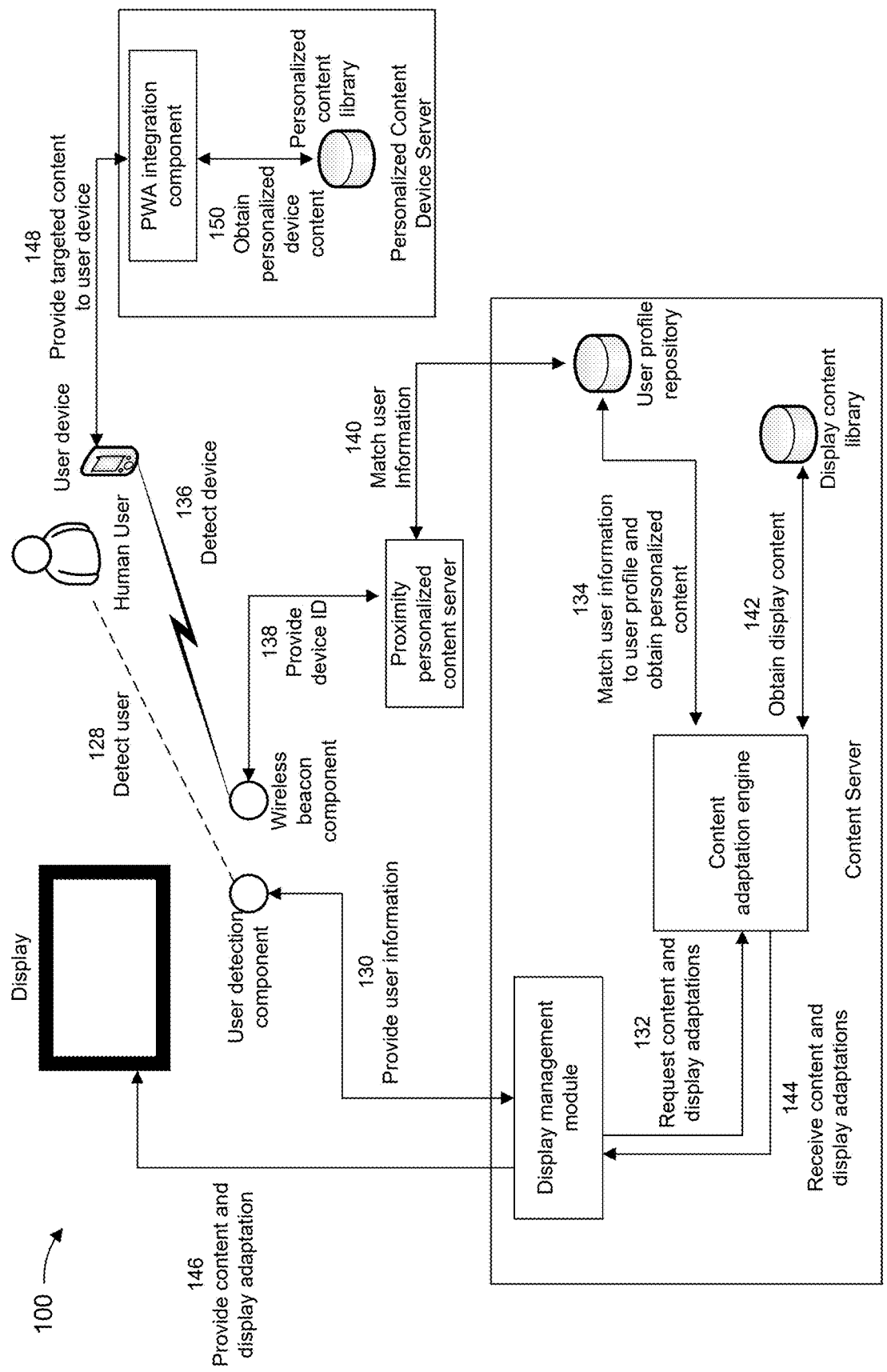

FIGS. 1A-1C are diagrams of one or more examples 100 associated with responsive digital messaging with integrated detection for adaptive displays. As shown in FIGS. 1A-1C, example(s) 100 includes a user detection component, a content server, a personalized content display server, a display, a personalized content device server, a wireless beacon component, and/or a user device. These devices are described in more detail in connection with FIGS. 4 and 5.

As shown in FIG. 1A, and by reference number 102, the user detection component may detect a user. For example, in some implementations, the user detection component may be configured to detect users within a threshold distance to the display and/or to the user detection component. In some implementations, the user detection system may utilize one or more detection methods to detect a user, as described herein. Similarly, the user detection system may be configured to detect one or more user devices (e.g., a smartphone, a tablet computer, or the like) associated with the user. In some implementations, the user detection component may collect one or more data types and/or data values associated with the user, including image data, distance, position (e.g., relative and/or absolute position), visual and/or appearance data (e.g., biometric data, body data, facial data, eye data, or the like), motion data, object data, feature data, thermal data, audio data, time series data, environmental data (e.g., ambient light, global positioning system location data, or the like), among other examples.

In some implementations, one or more user detection components may be integrated with the display and/or one or more user detection components may be physically separate from the display. For example, a user detection component may be capable of connection to the display via a wired and/or a wireless connection. Similarly, one or more user detection components may be in communication with one or more different displays via a network, including a wired network and/or a wireless network. For example, a room may include one or more user detection components in order to provide more accurate data concerning a position associated with a user in the room.

As shown in FIG. 1A, and by reference number 104, the user detection component may provide, and a display management module of a content server may receive, user information associated with the detected user. For example, the user information may include proximity data associated with the user (e.g., a distance between a user and a display), a user profile and/or user identification information, a user device identification of a user device associated with the user, user vector and/or position information (e.g., relative position, speed data, predicted path data, previous path data), historical information associated with the user (e.g., information related to historical interactions between the user and the display), or the like. For example, where the user detection component provides user identification information, one or more components of the content server may attempt to match the user identification information with a user profile associated with the detected user, thereby enabling the content server to customize display elements (e.g., content assets, display adaptations, or the like) to the detected user. Similarly, where the user detection component detects an identifying feature of the user (e.g., a badge, a name tag, a face, a user device, or the like), the user detection component may provide user information, including user identification information (e.g., a user profile, user account, or the like) to the display management module. Additionally, or alternatively, the user detection component may provide, and one or more components of the content server (e.g., the display management module, or the like) may receive, detection data, where the one or more components of the content server may process the detection data to generate the user information.

As shown in FIG. 1A, and by reference number 106, the display management module may request content and display adaptations from a content adaptation engine. For example, the display management module may provide, and the content adaptation engine may receive, user information associated with the user, including user information described herein. In some implementations, based on the user information, the content adaptation engine may obtain a set of display elements associated with a display (e.g., compatible with the display, specific to the display, or the like), where the display elements may include at least one content asset and at least one display adaptation. Furthermore, the content adaptation engine may obtain decision information defining one or more conditions for selecting one or more display elements associated with the display. For example, in some implementations, the decision information may be associated with position data associated with the user and may include at least one proximity data threshold for selecting one or more display elements from the set of display elements.

In some implementations, the content adaptation engine may select one or more display elements from the set of display elements. For example, based on the user information and/or proximity data received from the display management module, the content adaptation engine may determine the appropriate content, content formatting, content complexity level (e.g., the amount and type of content), or the like, and the content adaptation engine may select one or more corresponding content elements. For example, where a user is identified (e.g., associated with a user profile), the content adaptation engine may select content that is customized to the user. As an additional example, where a user is identified as unknown (e.g., unidentified and/or unassociated with a user profile) and the distance between the user and a display satisfies (e.g., is equal to or greater than) a distance threshold indicating that the user is far away from the display, the content adaptation engine may select content tailored toward an unknown user and may select display adaptations that may render the content in a relatively large size to increase the probability that the content will be legible to the user. Additionally, or alternatively, where the user information and/or associated data indicates that the user is engaged or unengaged with the content, the content adaptation engine may determine the appropriate content depending on the user engagement information. For example, where the user information indicates that a user is looking away from (e.g., unengaged from the display), the content adaptation engine may select content that is intended to engage the user's attention (e.g., bright and/or dynamic text, animation, videos, or the like).

As shown in FIG. 1A, and by reference number 108, the content adaptation engine may provide, and the display management module may receive, the one or more display elements selected by the content adaptation engine. In some implementations, the one or more display elements may include at least one content asset and at least one display adaptation. For example, a content asset may include text, images, graphics, and/or videos, among other examples. Similarly, a display adaptation may include formatting, sizing, font, or similar configurations that may be applied to alter one or more content assets.

As shown in FIG. 1A, and by reference number 110, the display management module may provide, and the display may receive, the one or more display elements. Additionally, or alternatively, in some implementations, the display management module may provide, and the display may receive, a set of instructions for displaying one or more display elements. For example, in some implementations, the set of instructions may include instructions for displaying at least one content asset and applying at least one display adaptation in order to alter the at least one content asset.

In some implementations, the display elements may be selected based on position data associated with the user and/or the set of instructions may be applied to the content asset and the display adaptation based on position data associated with the user. For example, the position data may include at least one proximity data threshold for selecting the one or more display elements from a set of display elements associated with the display. Additionally, the decision information defining one or more conditions for selecting the one or more display elements may be associated with the position data and may include at least one proximity data threshold for selecting the one or more display elements. For example, where the distance between a user and a display satisfies (e.g., is equal to or less than) a proximity data threshold indicating that the user is close to the display, the system may be configured to select one or more display elements that include content assets and display adaptations adapted for a user in relatively close distance to the display. As an example, the content asset may feature denser, more detail-rich messaging (e.g., including relatively smaller text, graphics, or the like) that may be legible when in relatively close distance to the display, where such content assets and display adaptations may not be legible to a user at a relatively greater distance from the display. Additionally, where a content server receives updated position information associated with the user, the content server may obtain updated decision information based on the updated position data and may select updated display elements based on the updated decision information (e.g., text size may increase and/or detail may decrease when a user located within a relatively close distance from the display leaves the detection frame and a new user is detected far away from the display). Furthermore, the updated display elements selected by the content server may include updated content assets and updated display adaptations that are provided to the display, where the updated content assets may be displayed and the display adaptation may be applied to the updated content assets in order to alter the content assets based on the updated position data. For example, where the user detection component provides updated user position data to the content server indicating that the distance between the user and the display satisfies (e.g., is equal to or greater than) a proximity data threshold indicating that the user is far away from the display, the system may be configured to select one or more display elements that include content assets and display adaptations adapted for a user in relatively far away from the display. As an example, the content asset may feature larger, less detailed messaging (e.g., including relatively larger text, graphics, or the like) that may be legible when relatively far away from the display.

In some implementations, the user detection component may provide, and the content server may receive, biometric data that includes visual identification associated with a user, including facial recognition data, engagement data (e.g., eye tracking information, gaze tracking information, and/or face tracking information associated with the user), and/or biometric identification data. For example, the engagement data may include information indicating whether a user is viewing the display and/or an indication of one or more portions of the display that the user has viewed and/or how long the user has viewed the displayed content (e.g., according to one or more engagement conditions or thresholds), among other examples. Similarly, the facial recognition data and/or eye identification data may enable the content server to identify a user based on data associated with the face and/or eyes of a user. Additionally, or alternatively, the user detection component may indicate whether a user is wearing glasses or sunglasses, which may result in reduced accuracy or may prevent the user detection component from obtaining engagement and/or eye identification data. For example, by providing eye detection and/or engagement information in addition to other data (e.g., facial recognition data or the like), the system may adapt content and/or content formatting to a user that is viewing content on the display, including the positioning of content to increase the probability of the user viewing the content. Additionally, by adapting content and/or content formatting on one or more displays based on a movement path (e.g., a vector) and/or the behavior of a user, each display may provide unique (e.g., not previously provided) content to the user at different points along the movement path. In such an implementation, the content server may be connected to the displays via networked connections for communication and content delivery. For example, one or more user detection devices (and/or a component of the content server) may be used to identify the movement path of a user and/or predict the movement path of a user using artificial intelligence/machine learning (AI/ML) techniques described herein, thereby enabling displays to be customized along the movement path of the user. For example, such customization may be used to display directions that instruct a user along the user's path to a destination, where such directions are updated and adapted to the user and the position of the user.

In some implementations, one or more components of the content server may select updated display elements, including updated content assets and updated display adaptations, based on a condition being satisfied, where the content server may provide updated display elements to the display in order for the display to show the updated content assets and apply the updated display adaptations to alter the updated content assets based on the condition being satisfied. For example, where a user has remained in a close distance relative to the display for a time period that satisfies (e.g., is equal to or greater than) a time period threshold, the content server may select updated display elements for the display to show to the user. As an example, a user remaining in the close distance area may be indicative of an increased interest in the displayed content, and the content server may provide the display with display content that includes "call to action" content that requests the user take action with regard to the displayed content after a certain time period.

In some implementations, where a user profile is associated with a detected user, the user profile may include historical information associated with the user, including a history of interactions between the user and one or more displays. For example, by providing the content server with historical data associated with the user, the content server may select content customized for the user, including content that is new to the user, content that is intended to increase the probability of the user taking an action based on historical actions associated with the user, or the like.

In some implementations, where the user detection device detects multiple users, the content server may select display elements and/or provide instructions to the display that are tailored to one or more conditions. For example, the content server may select generic display elements for the display to show based on the detection of more than one user. Alternatively, the content server may select display elements that are tailored to the user closest to the display, the user farthest from the display, a user that is located closest to a median or average distance from the display based on all detected users, and/or the user that satisfies a certain proximity threshold, among other examples. Additionally, or alternatively, where more than one user is detected, the content server may select display elements that are tailored to an average distance or a weighted average distance of the detected users. For example, if a first user is detected at a distance of ten feet from the display and a second user is detected at a distance of twenty feet from the display, the content server may display elements tailored to a user that is located 15 feet from the display. Similarly, the use of an average distance may be weighted to favor the distance of one user over the other. Additionally, where the user detection component detects that a user has left the field of detection and/or has become occluded from detection, the content server may select display elements that are tailored to one or more of these conditions. For example, the content server may select generic display elements or the content server may instruct the display to enter a powered-off or low-power mode based on a user leaving the field of detection and there being no other users in the field of detection.

In some implementations, the display management module may render the one or more display elements on the display and may apply the one or more display adaptations as part of rendering the one or more display elements on the display. Additionally, or alternatively, the display may be configured to render the one or more display elements and to apply the display adaptations.

As shown in FIG. 1B, in some implementations, a system may identify a user profile associated with the user based on detected user information (e.g., biometric data or the like), and the user profile may be utilized to provide personalized content to the user via a display. For example, as shown in FIG. 1B, and by reference number 112, a user detection component may detect a user, as described herein. Additionally, and as shown by reference number 114, the user detection component may provide, and a display management module may receive, user information, including a user identification, and/or visual data associated with the user, among other examples and as described herein.

As shown in FIG. 1B, and by reference number 116, the display management module may transmit, and a content adaptation engine may receive, a request for content and display adaptations, as described herein. For example, the request for content and display adaptations may be associated with the user information, the display, or the like.

As shown in FIG. 1B, and by reference number 118, the content adaptation engine may communicate with a user profile repository to match the user information received from the user detection component (e.g., via the display management module) to a user profile in order to obtain content that is personalized to the detected user (e.g., the user associated with the user profile). For example, the user profile repository may store user information, including user preferences, user interest information, and/or historical information associated with the user profile, among other examples.

In some implementations, where the user detection component provides appearance data associated with the user, the content adaptation engine may obtain a set of user profiles, where each user profile may be associated with appearance data. The content adaptation engine may then determine a user profile from the set of user profiles based on a comparison between the appearance data provided by the user detection component and the appearance data associated with the user profile. The content adaptation engine may then use the user profile as part of decision information for defining one or more conditions for selecting display content to be provided to the display. For example, the user profile may be used to obtain display content that is personalized and/or associated with the user profile.

As shown in FIG. 1B, and by reference number 120, in some implementations, the user profile repository may be in communication with a personalized content display server from which one or more components of the content server may obtain the content that is personalized to the user. In some implementations, the personalized content display server may receive the user profile or other information associated with a user identity in order to select content that is personalized to the user. For example, the content may be personalized based on user preferences, user location, and/or historical information associated with the user, among other examples. Additionally, or alternatively, the content adaptation engine and/or additional components of the content server may be in communication with the personalized content display server in order to obtain content that is personalized to the user (e.g., based on the matching of the user information to the user profile to enable the component to obtain the personalized content for the user profile).

As shown in FIG. 1B, and by reference number 122, the content adaptation engine may obtain display content from a display content library. The display content may be obtained in addition to or as an alternative to the personalized content obtained from the personalized content display server. For example, the content adaptation engine may obtain display elements from the display content library that are personalized to the detected user based on the user profile associated with the user. For example, the personalized content may include content that may be specific to the user (e.g., based on the user profile) and the display content may include generic, universal, or other content that may not be specific to the user. As an additional example, where the content adaptation engine is unable to match the user information to a user profile, the content adaptation engine may exclusively obtain display content from the display content library, where such content may be adapted to the user information associated with the detected user.

As shown in FIG. 1B, and by reference number 124, the content adaptation engine may provide, and the display management module may receive, content and display adaptations, as described herein. For example, the content adaptation engine may provide one or more display elements, which may include content assets and display adaptations. Additionally, or alternatively, in some implementations, the display management module may provide, and the display may receive, a set of instructions for displaying one or more display elements. For example, in some implementations, the set of instructions may include instructions for displaying at least one content asset and applying at least one display adaptation in order to alter the at least one content asset.

As shown in FIG. 1B, and by reference number 126, the display management module may provide, and the display may receive, content and display adaptations, as described herein. For example, the content adaptation engine may provide one or more display elements, which may include content assets and display adaptations. Additionally, or alternatively, in some implementations, the display management module may provide, and the display may receive, a set of instructions for displaying one or more display elements. For example, in some implementations, the set of instructions may include instructions for displaying at least one content asset and applying at least one display adaptation in order to alter the at least one content asset.

As shown in FIG. 1B, in some implementations, a system may identify a user profile associated with the user based on detected user information (e.g., biometric data or the like) and/or based on detection of a user device associated with the user, and the user profile may be utilized to provide personalized content to the user via a display and/or the user device. For example, as shown in FIG. 1C, and by reference number 128, a user detection component may detect a user, as described herein. Additionally, and as shown by reference number 130, the user detection component may provide, and a display management module may receive, user information, including a user identification, and/or visual data associated with the user, among other examples and as described herein.

As shown in FIG. 1C, and by reference number 132, the display management module may transmit, and a content adaptation engine may receive, a request for content and display adaptations, as described herein. For example, the request for content and display adaptations may be associated with the user information, the display, or the like.

As shown in FIG. 1C, and by reference number 134, the content adaptation engine may communicate with a user profile repository to match the user information received from the user detection component (e.g., via the display management module) to a user profile in order to obtain content that is personalized to the detected user (e.g., the user associated with the user profile), as described herein. For example, the user profile repository may store user information, including user preferences, user interest, and/or historical information associated with the user profile, among other examples.

In some implementations, the user profile repository and/or the content adaptation engine may be in communication with a proximity personalized content server or a similar server and/or component associated with personalizing content for a detected user from which the content server may obtain content that is personalized to the user. In some implementations, the personalized content display server may receive the user profile or other information associated with a user identity in order to select content that is personalized to the user. For example, the content may be personalized based on user preferences, user location, and/or historical information associated with the user, among other examples. Additionally, or alternatively, the content adaptation engine and/or additional components of the content server may be in communication with the proximity personalized content server in order to obtain content that is personalized to the user (e.g., subsequent to the matching of the user information to the user profile to enable the component to obtain the personalized content for the user profile).

As shown in FIG. 1C, and by reference number 136, a wireless beacon component may detect a user device associated with the user. For example, in some implementations, the wireless beacon component may emit a signal in order to detect user devices within a certain distance of the display and/or the wireless beacon component. For example, the wireless beacon component may emit a passive wireless signal (e.g., via Wi-Fi, Bluetooth, Zigbee, near-field communication (NFC), or the like) to detect user devices within a certain distance of the display and/or the wireless beacon component. In some implementations, the wireless beacon component may obtain device identification data associated with the user device, including media access control (MAC) address, probe requests, device fingerprinting, behavioral data (e.g., movement data from multiple interactions with the user device), received signal strength, or the like. Additionally, or alternatively, the wireless beacon component may include additional information associated with the user device, including proximity data associated with the user device, and/or historical information associated with the user device (e.g., information related to historical interactions between the user device and the display), among other examples.

As shown in FIG. 1C, and by reference number 138, the wireless beacon component may provide, and a proximity personalized content server may receive, the device identification associated with the detected user device.

As shown in FIG. 1C, and by reference number 140, the proximity personalized content server may attempt to match the device identification with user information (e.g., a user profile) associated with the user device. In some implementations, the proximity personalized content server may match the device identification with user information stored in a user profile repository. Where the device identification is matched with user information, the proximity personalized content server may provide the content server (e.g., the content adaptation engine, display content library, or the like) with content that is personalized to the user associated with the detected user device. For example, by matching the detected user device with the user information, the content server may customize display elements (e.g., content assets, display adaptations, or the like) for the detected user, as described herein. Additionally, or alternatively, the proximity personalized content server may provide the user information (e.g., a user profile) associated with the user device to a personalized content device server, which may be used to provide targeted (e.g., personalized) content to the user device. For example, the targeted content may be tailored to a user based on user preferences, user location, historical information associated with the user, among other examples. Additionally, or alternatively, where the user device information is not matched to a user profile (e.g., where the user does not have a user profile), the user device information may be used to personalize some content to the user device. For example, where the user device information indicates that the user device is a smartphone that utilizes a certain operating system, the targeted content may be different than the content that is utilized for users associated with a user device utilizing a different operating system.

Additionally, or alternatively, the device identification information may be used to obtain a user profile associated with a user detected by the user detection component. For example, where the content adaptation engine is unable to match user information received from the user detection component with a user profile in the user profile repository, the proximity personalized content server may provide the content server with the user profile associated with the user device of the detected user. Similarly, the user profile obtained by the proximity personalized content server (e.g., by matching the device identification of the user device with a user profile in the user profile repository) may be used to confirm the user profile that is obtained by matching the user information received from the user detection component with a user profile in the user profile repository. By utilizing the device identification provided by the wireless beacon component and the user information provided by the user detection component, the system may increase the accuracy of identifying the user profile associated with a detected user.

As shown in FIG. 1C, and by reference number 142, the content adaptation engine may obtain display content from a display content library. The display content may be obtained in addition to or as an alternative to the personalized content obtained from the proximity personalized content server. For example, the content adaptation engine may obtain display elements from the display content library that are personalized to the detected user based on the user profile associated with the user. For example, the personalized content may include content that may be specific to the user (e.g., based on the user profile) and the display content may include generic, universal, or other content that may not be specific to the user. As an additional example, where the content adaptation engine is unable to match the user information to a user profile, the content adaptation engine may exclusively obtain display content from the display content library.

As shown in FIG. 1C, and by reference number 144, the content adaptation engine may provide, and the display management module may receive, content and display adaptations, as described herein. For example, the content adaptation engine may provide one or more display elements, which may include content assets and display adaptations. Additionally, or alternatively, in some implementations, the display management module may provide, and the display may receive, a set of instructions for displaying one or more display elements. For example, in some implementations, the set of instructions may include instructions for displaying at least one content asset and applying at least one display adaptation in order to alter the at least one content asset.

As shown in FIG. 1C, and by reference number 146, the display management module may provide, and the display may receive, content and display adaptations, as described herein. For example, the content adaptation engine may provide one or more display elements, which may include content assets and display adaptations. Additionally, or alternatively, in some implementations, the display management module may provide, and the display may receive, a set of instructions for displaying one or more display elements. For example, in some implementations, the set of instructions may include instructions for displaying at least one content asset and applying at least one display adaptation in order to alter the at least one content asset.

As shown in FIG. 1C, and by reference number 148, a progressive web app (PWA) integration component of a personalized content device server may transmit, and the user device may receive, targeted content. For example, in some implementations, the targeted content may include display elements that are personalized to the user and/or the user device. For example, the display elements may include content assets and/or display adaptations. In some implementations, the PWA integration component may select display elements based on user device decision information defining one or more conditions for selection user device display elements to provide to the user device. For example, the user device decision information may be associated with the user profile associated with the user device and/or additional information associated with the user device, including proximity data indicating a distance between the user device and the display and/or the wireless beacon component. Additionally, the PWA integration component may select the user device display elements based on the user device decision information, where one or more of the user device display elements may include user device content assets and user device display adaptations. The PWA integration component may then provide a set of instructions and the selected user device display elements to the user device, where the set of instructions may include instructions for displaying the user device content assets and applying the user device display adaptations to alter the user device content asset based on information associated with the user device and/or the user (e.g., the user profile, position data associated with the user device, or the like).

In some implementations, the personalized content device server may be in communication with the content server and/or the proximity personalized content server via a network. For example, the personalized content device server may communicate with the content server in order to coordinate the display elements provided to the display and the targeted content provided to the detected user device. As an example, in a retail environment, a display associated with a product (e.g., in physical proximity to the product) may show content that is personalized to the user with respect to the product, based on the distance between the user and the display, where the content and the content formatting may adjust based on changes in the distance between the user and the display. For example, the display may show features that are relevant to the user based on previous interactions with the display, and/or purchasing options that are customized to the user, among other examples. Similarly, the user device associated with the user may display the same content as shown on the display and/or additional personalized content associated with the content shown on the display. For example, the user device may show content enabling the user to purchase the associated product via the user device. For example, in some implementations, the content shown on the display and the content shown on the user device may be adapted based on user information associated with the user (e.g., position data, historical information associated with the user and/or the product, or the like).

As shown in FIG. 1C, and by reference number 150, the PWA integration may obtain personalized device content from a personalized content library in order to provide targeted content to the user device. In some implementations, the personalized content library may include content that is categorized to enable personalization to a user associated with the user device, including user segments, and/or user interests, among other examples. Additionally, or alternatively, the PWA integration may obtain personalized device content based on a user profile associated with the user device, where the PWA integration component may be in communication with the content server (not shown in FIG. 1C) to obtain the user profile associated with the user device.

As described herein, a system may enable responsive digital messaging with integrated user detection for adaptive displays. For example, digital messaging may be adapted to the detected distance of a user from a display and/or to the identification of a user. As a result, digital messaging may deliver content that may be personalized to a user and may be formatted to the user based on a distance between the user and the display. Similarly, content shown on a display may be updated based on the determined, detected, and/or known identity of a user, thereby enabling content and/or content formatting that is customized to the user. For example, content and content formatting (e.g., sizing, typography, resolution, or the like) may be dynamically updated based on the distance between the user and the display, thereby providing content with increased relevance and an increased probability of user engagement. Additionally, by identifying a user device associated with a user, the system may provide dynamic, personalized content and/or content formatting to the user via the digital display and/or via the user device. Furthermore, by providing eye detection, gaze tracking, face detection, and/or engagement information, the system may adapt content and/or content formatting to a user that is viewing content on the display. Additionally, by adapting content and/or content formatting on one or more displays based on a movement path of a user, each display may provide unique (e.g., not previously provided) content to the user at different points along the movement path. Furthermore, a dynamic system that customizes the content and/or formatting on the display may optimize content delivery based on data associated with the user, thereby making more efficient use of the display and the associated system resources. For example, the display may turn off and/or hibernate screen content in response to certain users, users that are not viewing the content, and/or users located at or beyond a threshold distance from the display, thereby reducing power usage and/or wireless network traffic.

As indicated above, FIGS. 1A-1C are provided as one or more examples. Other examples may differ from what is described with regard to FIGS. 1A-1C.

Figure 2:
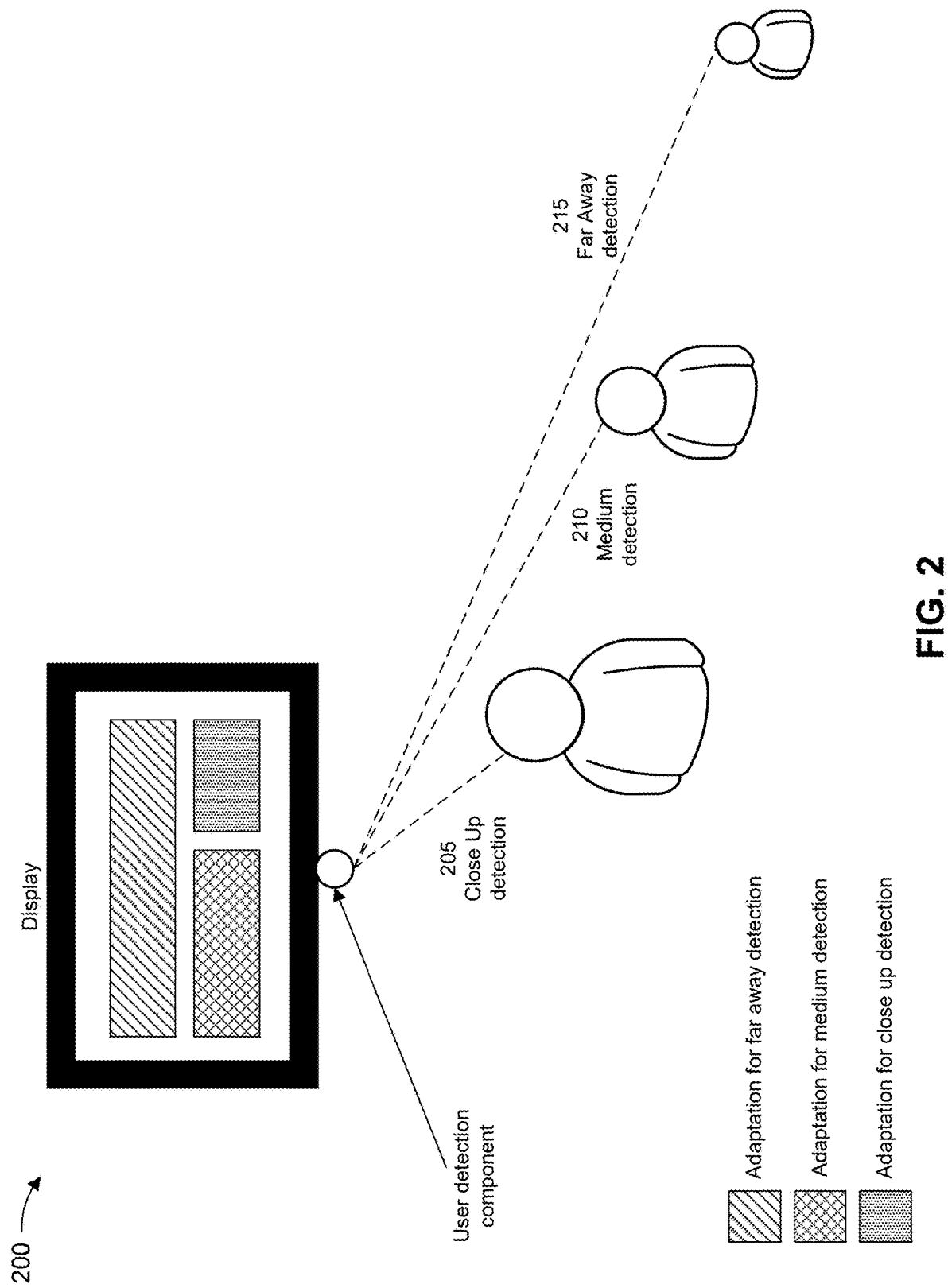
FIG. 2 is a diagram of an example associated with responsive digital messaging with integrated detection for adaptive displays, in accordance with some embodiments of the present disclosure.

FIG. 2 is a diagram of an example 200 associated with responsive digital messaging with integrated detection for adaptive displays. As shown in FIG. 2, example 200 includes a display and a user detection component. These devices are described in more detail in connection with FIGS. 4 and 5.

As shown by reference number 205, where the distance between a user and a display satisfies (e.g., is equal to or less than) a close proximity data threshold, the system may be configured to select one or more display elements that include content assets and display adaptations adapted for a user that is within a relatively close distance to the display. As an example, the content asset may feature denser, more detail-rich messaging (e.g., including relatively smaller text, graphics, or the like) that may be legible when within a relatively close distance to the display, where such content assets and display adaptations may not be legible to a user at a relatively greater distance from the display.

As shown by reference number 210, where the distance between a user and a display satisfies a medium proximity data threshold (e.g., is within a range), the system may be configured to select one or more display elements that include content assets and display adaptations adapted for a user that is located farther from the display relative to the close proximity threshold and nearer to the display relative to a far away proximity threshold. As an example, the content asset may feature messaging that is less feature dense and detail rich (e.g., including relatively larger text, graphics, or the like) relative to the messaging provided to a user located at a distance from the display that satisfies the close proximity data threshold. For example, such content assets and display adaptations may be legible to a user at a relatively closer distance from the display, but may be illegible to a user at a relatively greater distance from the display. Similarly, the content asset may feature messaging that is denser and more detail rich (e.g., including relatively smaller, text, graphics, or the like) relative to the messaging provided to a user located at a distance from the display that satisfies the far away proximity data threshold, described below.

As shown by reference number 215, where the distance between a user and a display satisfies (e.g., is equal to or greater than) a far away proximity data threshold, the system may be configured to select one or more display elements that include content assets and display adaptations for a user that is located farther from the display relative to the close proximity threshold and the medium proximity threshold. As an example, the content asset may feature messaging that is less feature dense and detail rich (e.g., including relatively larger text, graphics, or the like) relative to the messaging provided to a user located at a distance from the display that satisfies the close proximity data threshold or the medium proximity data threshold. For example, such content assets and display adaptations may be legible to a user at a relatively closer distance from the display.

In some implementations the content may be dynamically adjusted within a proximity threshold (e.g., the close, medium, and far away proximity thresholds). For example, where the distance between a user and the display satisfies the far away proximity threshold, as the user moves nearer to the display, the display may adapt the content (e.g., decreasing the size, increasing the amount of detail, etc.) despite the user not moving to a distance from the display that satisfies the medium proximity threshold. As a result, the content may be continuously adjusted as the distance between the user and the display may continuously change, where, for example, the user moves around a room or along a hallway in which a display is located.

As described herein, a system may enable responsive digital messaging with integrated user detection for adaptive displays. For example, digital messaging may be adapted to the detected distance of a user from a display as well as changes in the detected distance of the user from the display. As a result, digital messaging may deliver content that may be personalized and formatted to the user based on a distance between the user and the display. For example, content and content formatting (e.g., sizing, typography, resolution, or the like) may be dynamically updated based on the distance between the user and the display, thereby providing content with increased relevance and an increased probability of user engagement. Additionally, by adapting content and/or content formatting on one or more displays based on a movement path of a user, each display may provide unique (e.g., not previously provided) content to the user at different points along the movement path. Additionally, a dynamic system that customizes the content and/or formatting on the display may optimize content delivery based on data associated with the user, thereby making more efficient use of the display and the associated system resources. For example, the display may turn off and/or hibernate screen content in response to certain users, users that are not viewing the content, and/or users located at or beyond a threshold distance from the display, thereby reducing power usage and/or wireless network traffic.

As indicated above, FIG. 2 is provided as an example. Other examples may differ from what is described with regard to FIG. 2.

Figure 3:
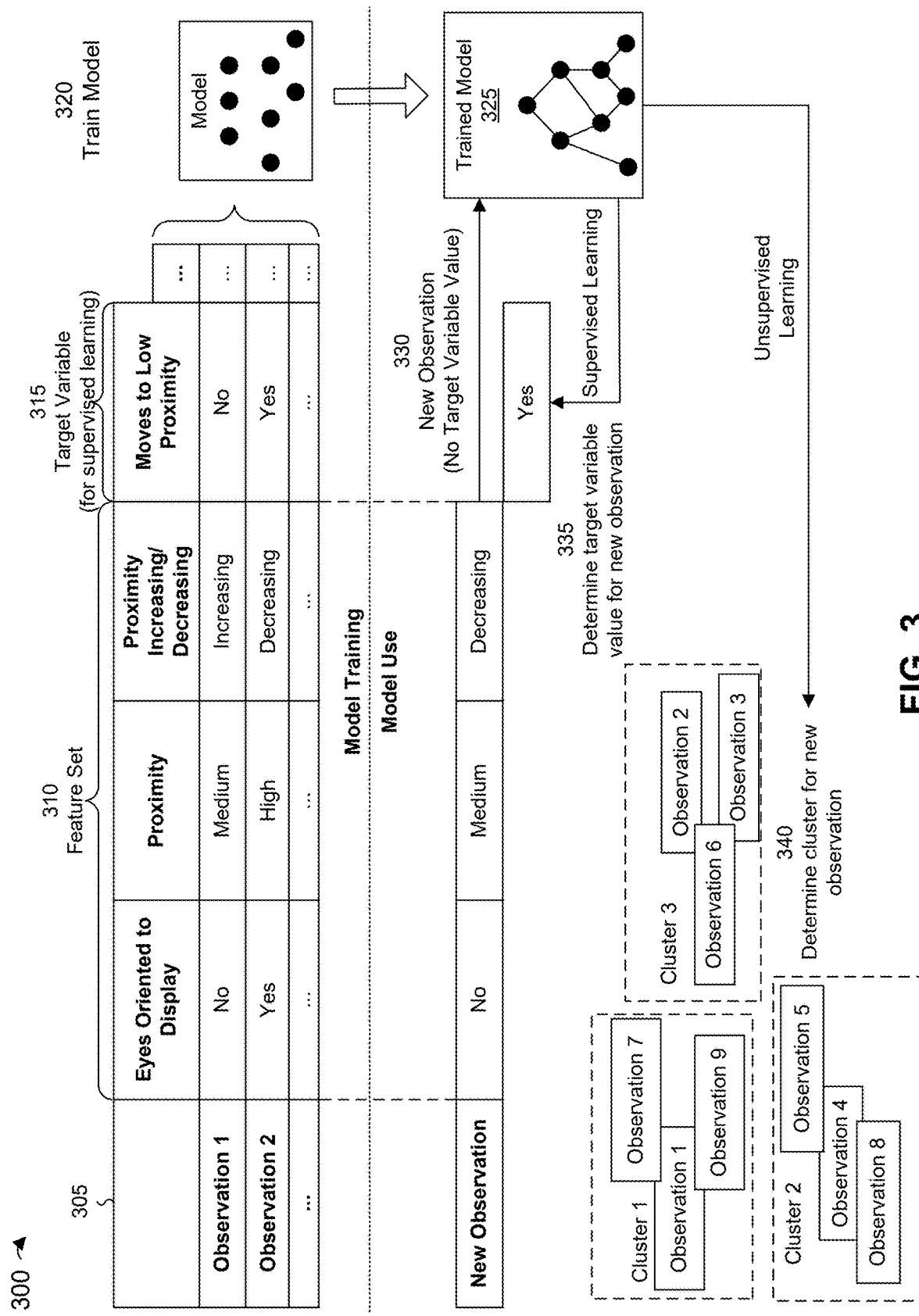
FIG. 3 is a diagram of an example of training and using a machine learning model in connection with responsive digital messaging with integrated detection for adaptive displays, in accordance with some embodiments of the present disclosure.

FIG. 3 is a diagram of an example 300 of training and using a machine learning model in connection with responsive digital messaging with integrated detection for adaptive displays. The machine learning model training and usage described herein may be performed using a machine learning system. The machine learning system may include or may be included in a computing device, a server, a cloud computing environment, or the like, such as the content server and responsive digital messaging system described in more detail elsewhere herein.

As shown by reference number 305, a machine learning model may be trained using a set of observations. The set of observations may be obtained from training data (e.g., historical data), such as data gathered during one or more processes described herein. In some implementations, the machine learning system may receive the set of observations (e.g., as input) from a detection system, a display system, a display data repository, a display user repository, a user detection component, a user device, and/or another suitable data source, as described elsewhere herein.

As shown by reference number 310, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from a detection system, a display system, a display data repository, a display user repository, a detection component, a user device, and/or another suitable data source. For example, the machine learning system may identify a feature set (e.g., one or more features and/or feature values) by extracting the feature set from structured data, by performing natural language processing and/or computer vision processing to extract the feature set from unstructured data, and/or by receiving input from an operator.

As an example, a feature set for a set of observations may include a first feature of Eyes Oriented to Display, a second feature of Proximity, a third feature of Proximity Increasing/Decreasing, and so on. As shown, for a first observation, the first feature may have a value of No (e.g., indicating that the detected eyes associated with the user are not oriented toward a display according to one or more engagement conditions or thresholds), the second feature may have a value of medium (e.g., indicating that the distance of the user relative to the display is classified as medium based on one or more proximity conditions and/or thresholds), the third feature may have a value of Increasing (e.g., indicating that the distance of the user relative to the display is increasing over a period of time), and so on. These features and feature values are provided as examples, and may differ in other examples. For example, the feature set may include one or more of the following features: user movement vector, detected user device type, detection of eyeglasses and/or sunglasses, detection time period, user movement velocity, number of users detected, and/or distance from one or more displays, among other examples.

As shown by reference number 315, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 300, the target variable is Moves to Low Proximity, which has a value of No for the first observation.

The feature set and target variable described above are provided as examples, and other examples may differ from what is described above. For example, for a target variable of Detection of Glasses, the feature set may include a No option, an Eyeglasses option (e.g., the user is detected as wearing eyeglasses), a Sunglasses option (e.g., the user is detected as wearing sunglasses), or the like.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 320, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 325 to be used to analyze new observations.

As an example, the machine learning system may obtain training data for the set of observations based on historical data indicating whether a user has interacted with a display, historical content and/or display adaptation that have been presented to one or more users, detected user device types, or the like.

As shown by reference number 330, the machine learning system may apply the trained machine learning model 325 to a new observation, such as by receiving a new observation and inputting the new observation to the trained machine learning model 325. As shown, the new observation may include a first feature of No (e.g., indicating that the detected eyes associated with the user are not oriented toward a display according to one or more engagement conditions or thresholds), a second feature of High (e.g., indicating that the distance of the user relative to the display is classified as High based on one or more proximity conditions), and a third feature of Decreasing (e.g., indicating that the distance of the user relative to the display is decreasing over a period of time), and so on, as an example. The machine learning system may apply the trained machine learning model 325 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 325 may predict a value of Yes for the target variable of Moves to Low Proximity for the new observation, as shown by reference number 335. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, a recommendation to update content provided to a display in order to retain user engagement while the user is located within a relatively close distance to the display. The first automated action may include, for example, providing updated content and/or display adaptations to the display in order to dynamically update the content displayed to the user in an attempt to retain the user within a relatively low distance to the display.

As another example, if the machine learning system were to predict a value of No for the target variable of Moves to Low Proximity, then the machine learning system may provide a second (e.g., different) recommendation (e.g., recommending that the content server cease displaying content tailored to the user), and/or may perform or cause performance of a second (e.g., different) automated action (e.g., cease displaying content to the user and/or display content that is personalized to a different detected user).

In some implementations, the trained machine learning model 325 may classify (e.g., cluster) the new observation in a cluster, as shown by reference number 340. The observations within a cluster may have a threshold degree of similarity. As an example, if the machine learning system classifies the new observation in a first cluster (e.g., user moves to low proximity), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., user does not move to low proximity), then the machine learning system may provide a second (e.g., different) recommendation, such as the second recommendation described above, and/or may perform or cause performance of a second (e.g., different) automated action, such as the second automated action described above.

In some implementations, the recommendation and/or the automated action associated with the new observation may be based on a target variable value having a particular label (e.g., classification or categorization), may be based on whether a target variable value satisfies one or more thresholds (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 325 may be re-trained using feedback information. For example, feedback may be provided to the machine learning model. The feedback may be associated with actions performed based on the recommendations provided by the trained machine learning model 325 and/or automated actions performed, or caused, by the trained machine learning model 325. In other words, the recommendations and/or actions output by the trained machine learning model 325 may be used as inputs to re-train the machine learning model (e.g., a feedback loop may be used to train and/or update the machine learning model). For example, the feedback information may include information that is obtained or otherwise gathered via an instance of adapting digital display messaging, content, and/or formatting based on detection of a user.

In this way, the machine learning system may apply a rigorous and automated process to select appropriate display elements to be provided to a display based on information associated with a detected user. The machine learning system may enable recognition and/or identification of tens, hundreds, thousands, or millions of features and/or feature values for tens, hundreds, thousands, or millions of observations, thereby increasing accuracy and consistency and reducing delay associated with selecting display elements to be provided to a display based on information associated with the detected user relative to requiring computing resources to be allocated for tens, hundreds, or thousands of operators to manually select display elements to be provided to a display based on information associated with the detected user.

As indicated above, FIG. 3 is provided as an example. Other examples may differ from what is described with regard to FIG. 3.

Figure 4:
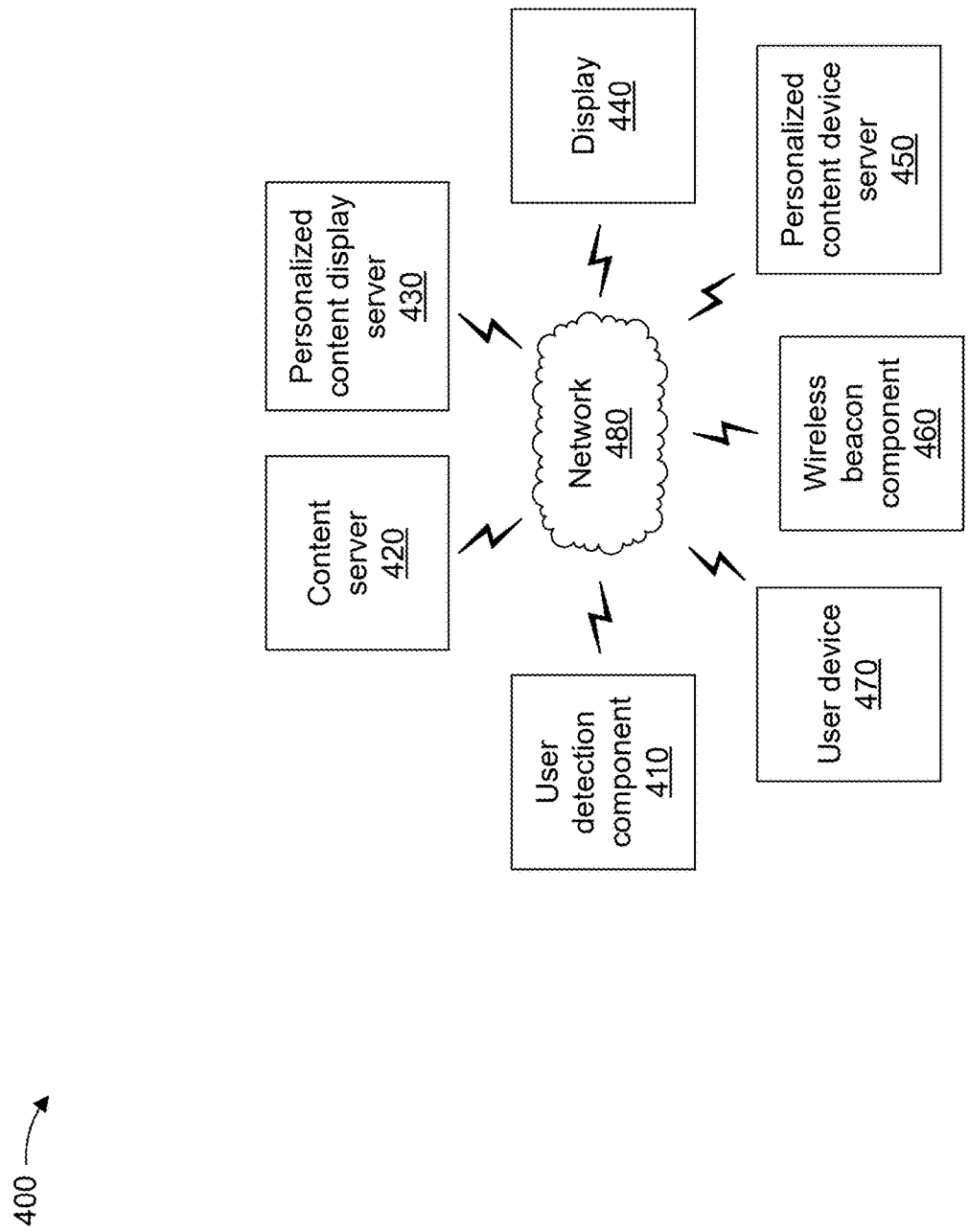
FIG. 4 is a diagram of an example environment in which systems and/or methods described herein may be implemented, in accordance with some embodiments of the present disclosure.

FIG. 4 is a diagram of an example environment 400 in which systems and/or methods described herein may be implemented. As shown in FIG. 4, environment 400 may include a user detection component 410, a content server 420, a personalized content display server 430, a display 440, a personalized content device server 450, a wireless beacon component 460, a user device 470, and a network 480. Devices of environment 400 may interconnect via wired connections, wireless connections, or a combination of wired and wireless connections.

The user detection component 410 may include one or more devices capable of receiving, generating, storing, processing, providing, and/or routing information associated with responsive digital messaging with integrated detection for adaptive user device displays, as described elsewhere herein. The user detection component 410 may include a communication device, a detection device, and/or a computing device. For example, the user detection component 410 may include a digital camera, a web camera, a light detection and radar (LiDAR) detection device, a radio detection and ranging (RADAR) system, an infrared sensor, an ultrasonic sensor, a camera associated with AI/ML, a thermal imaging sensor, an audio recognition system, a proximity sensor, a distance sensor, and/or a similar user detection device.

The content server 420 may include one or more devices capable of receiving, generating, storing, processing, providing, and/or routing information associated with responsive digital messaging with integrated detection for adaptive displays, as described elsewhere herein. The content server 420 may include a communication device and/or a computing device. For example, the content server 420 may include a server, such as an application server, a client server, a web server, a database server, a host server, a proxy server, a virtual server (e.g., executing on computing hardware), a server in a cloud computing system, or a similar server device. In some implementations, the content server 420 may include computing hardware used in a cloud computing environment.

The personalized content display server 430 may include one or more devices capable of receiving, generating, storing, processing, providing, and/or routing information associated with providing display content that may be personalized to a user, as described elsewhere herein. The personalized content display server 430 may include a communication device and/or a computing device. For example, the personalized content display server 430 may include a server, such as an application server, a client server, a web server, a database server, a host server, a proxy server, a virtual server (e.g., executing on computing hardware), or a server in a cloud computing system. In some implementations, the personalized content display server 430 may include computing hardware used in a cloud computing environment.

The display 440 may include one or more devices capable of receiving, generating, storing, and/or providing graphical representations and/or graphical user interfaces associated with responsive digital messaging with integrated detection for adaptive user device displays, as described elsewhere herein. The display 440 may include a display device, a communication device, and/or a computing device. For example, the display 440 may include a television, a projector, a computer monitor, a wearable display device, a tablet computer, a smartphone, or the like.

The personalized content device server 450 may include one or more devices capable of receiving, generating, storing, processing, providing, and/or routing information associated with providing device content that may be personalized to a user and to a user device associated with the user, as described elsewhere herein. The personalized content device server 450 may include a communication device and/or a computing device. For example, the personalized content device server 450 may include a server, such as an application server, a client server, a web server, a database server, a host server, a proxy server, a virtual server (e.g., executing on computing hardware), or a server in a cloud computing system. In some implementations, the personalized content device server 450 may include computing hardware used in a cloud computing environment.

The wireless beacon component 460 may include one or more devices capable of receiving, generating, storing, processing, and/or providing information associated with responsive digital messaging with integrated detection for adaptive user device displays, as described elsewhere herein. The wireless beacon component may include a communication device and/or a computing device. For the example the wireless beacon component may include a wireless communication device, a wireless beacon and/or passive wireless detection device that operates on one or more wireless communication standards (e.g., Wi-Fi, Bluetooth, Zigbee, NFC, or the like) and/or one or more licensed and/or unlicensed wireless communication spectrums, or a similar type of device.

The user device 470 may include one or more devices capable of receiving, generating, storing, processing, and/or providing information associated with responsive digital messaging with integrated detection for adaptive user device displays, as described elsewhere herein. The user device 470 may include a communication device and/or a computing device. For example, the user device 470 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The network 480 may include one or more wired and/or wireless networks. For example, the network 480 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 480 enables communication among the devices of environment 400.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
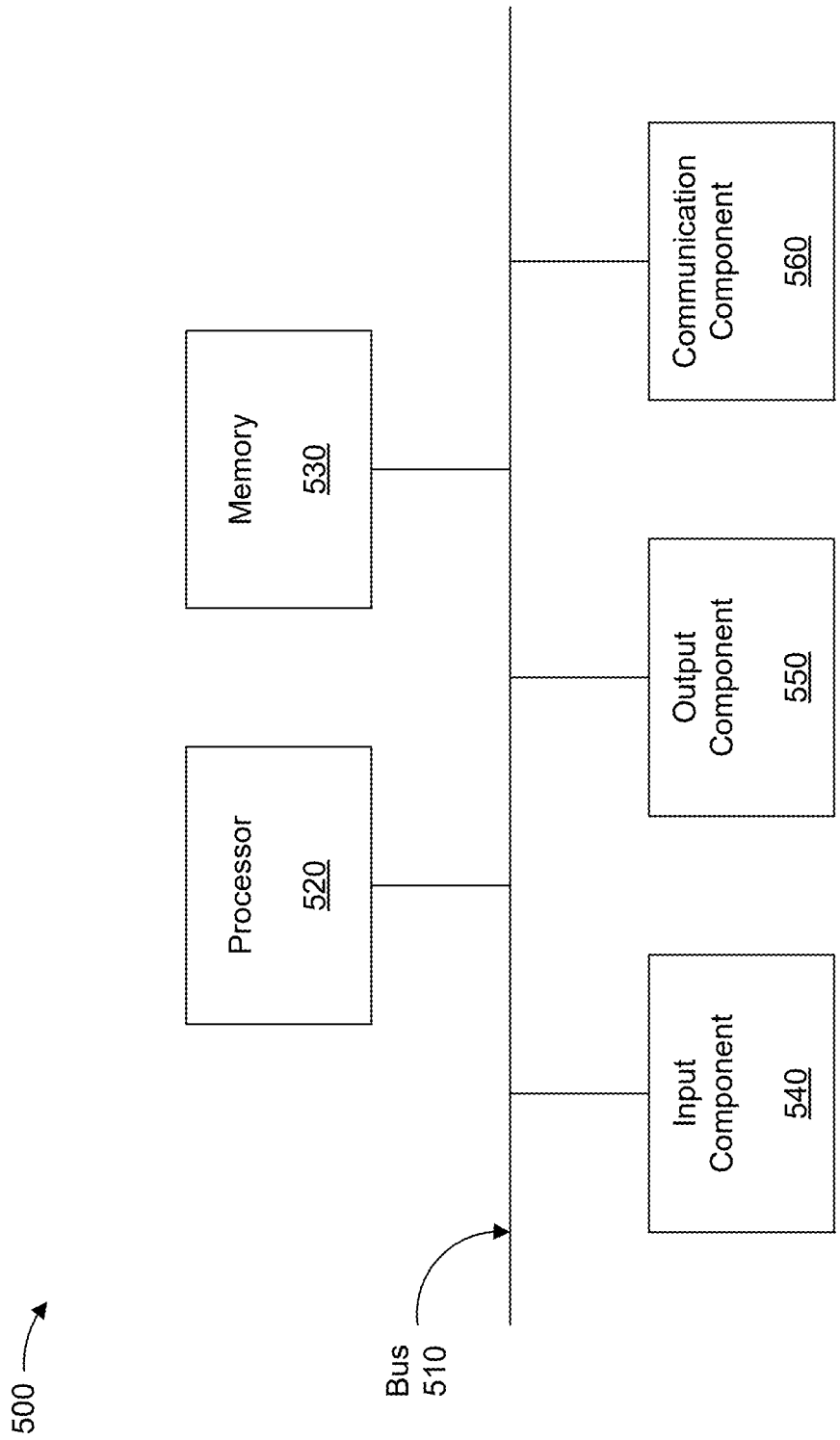
FIG. 5 is a diagram of example components of a device associated with responsive digital messaging with integrated detection for adaptive displays, in accordance with some embodiments of the present disclosure.

FIG. 5 is a diagram of example components of a device 500 associated with responsive digital messaging with integrated detection for adaptive displays. The device 500 may correspond to a user detection component, a content server, a personalized content display server, a display, a personalized content device server, a wireless beacon component, and/or a user device. In some implementations, a user detection component, a content server, a personalized content display server, a display, a personalized content device server, a wireless beacon component, and/or a user device may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

FIG. 6 is a flowchart of an example process 600 associated with responsive digital messaging with integrated detection for adaptive displays. In some implementations, one or more process blocks of FIG. 6 may be performed by the content server 420. In some implementations, one or more process blocks of FIG. 6 may be performed by another device or a group of devices separate from or including the content server 420, such as the user detection component 410, the personalized content display server 430, the display 440, the personalized content device server 450, the wireless beacon component 460, and/or the user device 470. Additionally, or alternatively, one or more process blocks of FIG. 6 may be performed by one or more components of the device 500, such as processor 520, memory 530, input component 540, output component 550, and/or communication component 560.

As shown in FIG. 6, process 600 may include receiving position data associated with a user (block 610). For example, the content server 420 (e.g., using processor 520, memory 530, input component 540, and/or communication component 560) may receive position data associated with a user, as described above in connection with reference number 104 of FIG. 1A. As an example, a content server 420 may be associated with a display located in a retail environment, where the content server 420 receives position data indicating that a user is within a certain proximity of a display. In some implementations, the position data includes proximity data associated with a distance between the user and a display. As an example, the content server 420 may receive proximity data indicating a distance between the user and the display.

As further shown in FIG. 6, process 600 may include obtaining a set of display elements associated with the display (block 620). For example, the content server 420 (e.g., using processor 520 and/or memory 530) may obtain a set of display elements associated with the display, as described above in connection with reference number 108 of FIG. 1A. As an example, the content server 420 may obtain a set of content assets and display adaptations for potential display to the user that was detected.

As further shown in FIG. 6, process 600 may include obtaining decision information defining one or more conditions for selecting one or more display elements from the set of display elements associated with the display (block 630). For example, the content server 420 (e.g., using processor 520 and/or memory 530) may obtain decision information defining one or more conditions for selecting one or more display elements from the set of display elements associated with the display, as described above in connection with reference number 108 of FIG. 1A. As an example, the content server 420 may obtain information associated with certain thresholds that may be used to provide and adjust content shown on the display depending on whether information associated with the user satisfies one or more of these thresholds. In some implementations, the decision information is associated with the position data and includes at least one proximity data threshold for selecting the one or more display elements from the set of display elements. As an example, the information obtained by the content server 420 may include thresholds that specify the content assets and display adaptions to be shown to the user depending on how far the user is located from the display.

As further shown in FIG. 6, process 600 may include selecting one or more display elements from the set of display elements based on the decision information (block 640). For example, the content server 420 (e.g., using processor 520 and/or memory 530) may select one or more display elements from the set of display elements based on the decision information, as described above in connection with reference number 110 of FIG. 1A. As an example, the content server 420 may select the display elements depending on the distance between the user and the display, where the display may show larger, less detailed content to users relatively far away from the display and the display may show smaller, more detailed content to users relatively close to the display. In some implementations, the selected one or more display elements include at least one content asset and at least one display adaptation. As an example, the display elements may include text, images, graphics, videos, or similar content and may include configurations that adjust the sizing, font, or similar characteristics of the displayed content.

As further shown in FIG. 6, process 600 may include providing a set of instructions and the selected one or more display elements to the display (block 650). For example, the content server 420 (e.g., using processor 520 and/or memory 530) may provide a set of instructions and the selected one or more display elements to the display, as described above in connection with reference number 110 of FIG. 1A. As an example, the selected text, images, graphics, videos or similar content and the configurations that adjust sizing, font, or similar characteristics of the content may be provided to the display. In some implementations, the set of instructions includes instructions for displaying the at least one content asset and applying the at least one display adaptation in order to alter the at least one content asset based on the position data. As an example, the display content may be provided with instructions that instruct the display as to the content (e.g., text, images, graphics, videos, or similar content) to be displayed and as to the adaptations (e.g. sizing, font, or similar characteristics) that may be applied to the content. For example, the display may show larger, less detailed content to users relatively far away from the display and the display may show smaller, more detailed content to users relatively close to the display.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. The process 600 is an example of one process that may be performed by one or more devices described herein. These one or more devices may perform one or more other processes based on operations described herein, such as the operations described in connection with FIG. 1A, FIG. 1B, FIG. 1C, FIG. 2, and FIG. 3. Moreover, while the process 600 has been described in relation to the devices and components of the preceding figures, the process 600 can be performed using alternative, additional, or fewer devices and/or components. Thus, the process 600 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for responsive digital messaging with integrated detection for adaptive displays, the system comprising:
   one or more memories; and
   one or more processors, communicatively coupled to the one or more memories, configured to:
   receive position data associated with a user,
      wherein the position data includes proximity data associated with a distance between the user and a display;
   obtain a set of display elements associated with the display;
   obtain decision information defining one or more conditions for selecting one or more display elements from the set of display elements associated with the display,
      wherein the decision information is associated with the position data and includes at least one proximity data threshold for selecting the one or more display elements from the set of display elements;

select one or more display elements from the set of display elements based on the decision information,
    wherein the selected one or more display elements include at least one content asset and at least one display adaptation; and
provide a set of instructions and the selected one or more display elements to the display,
    wherein the set of instructions includes instructions for displaying the at least one content asset and applying the at least one display adaptation in order to alter the at least one content asset based on the position data.

2. The system of claim 1, wherein the one or more processors are further configured to:
receive updated position data associated with the user,
obtain updated decision information based on the updated position data;
select an updated one or more display elements from the set of display elements based on the updated decision information,
    wherein the selected updated one or more display elements include at least one updated content asset and at least one updated display adaptation; and
provide the updated one or more display elements to the display,
    wherein the set of instructions includes instructions for displaying the at least one updated content asset and applying the at least one updated display adaptation in order to alter the at least one updated content asset based on the updated position data.

3. The system of claim 1, wherein the one or more processors are further configured to:
receive updated position data associated with the user,
    wherein the updated position data includes engagement data;
obtain updated decision information based on the updated position data,
    wherein the updated decision information includes at least one engagement data threshold for selecting the one or more display elements from the set of display elements;
select an updated one or more display elements from the set of display elements based on the updated decision information,
    wherein the selected updated one or more display elements include at least one updated content asset and at least one updated display adaptation; and
provide the updated one or more display elements to the display,
    wherein the set of instructions includes instructions for displaying the at least one updated content asset and applying the at least one updated display adaptation in order to alter the at least one updated content asset based on the updated position data.

4. The system of claim 1, wherein the one or more processors are further configured to:
perform tracking of the user based on the position data;
generate vector data based on the tracking of the user,
obtain updated decision information based on the vector data;
select an updated one or more display elements from the set of display elements based on the updated decision information,
    wherein the selected updated one or more display elements include at least one updated content asset and at least one updated display adaptation; and
provide the updated one or more display elements to the display,
    wherein the set of instructions includes instructions for displaying the at least one updated content asset and applying the at least one updated display adaptation in order to alter the at least one updated content asset based on the vector data.

5. The system of claim 1, wherein the one or more processors are further configured to:
receive a user identification associated with the user;
obtain updated decision information based on the user identification associated with the user;
select an updated one or more display elements from the set of display elements based on the updated decision information,
    wherein the selected updated one or more display elements include at least one updated content asset and at least one updated display adaptation; and
provide the updated one or more display elements to the display,
    wherein the set of instructions includes instructions for displaying the at least one updated content asset and applying the at least one updated display adaptation in order to alter the at least one updated content asset based on the user identification and the position data.

6. The system of claim 1, wherein the one or more processors are further configured to:
receive detected appearance data associated with the user;
obtain a set of user profiles,
    wherein each user profile of the set of user profiles is associated with appearance data; and
determine a user profile from the set of user profiles based on a comparison between the detected appearance data and the appearance data associated with the user profile,
    wherein the decision information is further associated with the determined user profile.

7. The system of claim 6, wherein the determined user profile includes information associated with a history of interactions between the user and the display.

8. The system of claim 1, wherein the one or more processors are further configured to:
receive detected user device identification data of a user device associated with the user;
obtain a set of user profiles,
    wherein each user profile of the set of user profiles is associated with user device identification data; and
determine a user profile from the set of user profiles based on a comparison between the detected user device identification data and the user device identification data associated with the user profile,
    wherein the decision information is further associated with the determined user profile.

9. The system of claim 8, wherein the one or more processors are further configured to:
obtain a set of user device display elements associated with the user device;
obtain user device decision information defining one or more conditions for selecting one or more user device display elements from the set of user device display elements associated with the user device,
    wherein the user device decision information is associated with the determined user profile and the position data associated with the user,
    wherein the user device decision information includes at least one proximity data threshold for selecting the one or more user device display elements from the set of user device display elements;
select one or more user device display elements from the set of user device display elements based on the user device decision information,
wherein the selected one or more user device display elements includes at least one user device content asset and at least one user device display adaptation; and
provide a set of instructions and the selected one or more user device display elements to the user device,
wherein the set of instructions includes instructions for displaying the at least one user device content asset and applying the at least one user device display adaptation to alter the at least one user device content asset based on the user profile and the position data.

10. The system of claim 1, wherein the one or more processors are further configured to:
select an updated one or more display elements from the set of display elements based on a threshold condition being satisfied,
wherein the selected updated one or more display elements include at least one updated content asset and at least one updated display adaptation; and
provide the updated one or more display elements to the display,
wherein the set of instructions includes instructions for displaying the at least one updated content asset and applying the at least one updated display adaptation to alter the at least updated one content asset based on the threshold condition being satisfied.

11. A method for responsive digital messaging with integrated detection for adaptive displays, comprising:
receiving, from at least one detection component, position data associated with a user,
wherein the position data includes proximity data associated with a distance between the user and a display;
obtaining a set of display elements associated with the display;
obtaining decision information defining one or more conditions for selecting one or more display elements from the set of display elements associated with the display,
wherein the decision information is associated with the position data and includes at least one proximity data threshold for selecting the one or more display elements from the set of display elements;
selecting one or more display elements from the set of display elements based on the decision information,
wherein the selected one or more display elements include at least one content asset and at least one display adaptation; and
providing a set of instructions and the selected one or more display elements to the display,
wherein the set of instructions includes instructions for displaying the at least one content asset and applying the at least one display adaptation in order to alter the at least one content asset based on the position data.

12. The method of claim 11, further comprising:
receiving updated position data associated with the user, obtaining updated decision information based on the updated position data;
selecting an updated one or more display elements from the set of display elements based on the updated decision information,
wherein the selected updated one or more display elements include at least one updated content asset and at least one updated display adaptation; and
providing the updated one or more display elements to the display,
wherein the set of instructions includes instructions for displaying the at least one updated content asset and applying the at least one updated display adaptation in order to alter the at least one updated content asset based on the updated position data.

13. The method of claim 11, further comprising:
receiving updated position data associated with the user,
wherein the updated position data includes engagement data;
obtaining updated decision information based on the updated position data,
wherein the updated decision information includes at least one engagement data threshold for selecting the one or more display elements from the set of display elements;
selecting an updated one or more display elements from the set of display elements based on the updated decision information,
wherein the selected updated one or more display elements include at least one updated content asset and at least one updated display adaptation; and
providing the updated one or more display elements to the display,
wherein the set of instructions includes instructions for displaying the at least one updated content asset and applying the at least one updated display adaptation in order to alter the at least one updated content asset based on the updated position data.

14. The method of claim 11, further comprising:
performing tracking of the user based on the position data;
generating vector data based on the tracking of the user,
obtaining updated decision information based on the vector data;
selecting an updated one or more display elements from the set of display elements based on the updated decision information,
wherein the selected updated one or more display elements include at least one updated content asset and at least one updated display adaptation; and
providing the updated one or more display elements to the display,
wherein the set of instructions includes instructions for displaying the at least one updated content asset and applying the at least one updated display adaptation in order to alter the at least one updated content asset based on the vector data.

15. The method of claim 11, further comprising:
receiving detected user device identification data of a user device associated with the user;
obtaining a set of user profiles,
wherein each user profile of the set of user profiles is associated with user device identification data; and
determining a user profile from the set of user profiles based on a comparison between the detected user device identification data and the user device identification data associated with the user profile,
wherein the decision information is further associated with the determined user profile.

16. A non-transitory computer-readable medium storing a set of instructions, the set of instructions comprising:
one or more instructions that, when executed by one or more processors of a system, cause the system to:

receive position data associated with a user,
  wherein the position data includes eye detection information and proximity data associated with a distance between the user and a display;
obtain a set of display elements associated with the display;
obtain decision information defining one or more conditions for selecting one or more display elements from the set of display elements associated with the display,
  wherein the decision information is associated with the position data and includes at least one proximity data threshold and at least one eye detection information threshold for selecting the one or more display elements from the set of display elements;
select one or more display elements from the set of display elements based on the decision information,
  wherein the selected one or more display elements include at least one content asset and at least one display adaptation; and
provide a set of instructions and the selected one or more display elements to the display,
  wherein the set of instructions includes instructions for displaying the at least one content asset and applying the at least one display adaptation in order to alter the at least one content asset based on the position data.

17. The non-transitory computer-readable medium of claim 16, wherein the one or more instructions further cause the system to:
receive updated position data associated with the user,
obtain updated decision information based on the updated position data;
select an updated one or more display elements from the set of display elements based on the updated decision information,
  wherein the selected updated one or more display elements include at least one updated content asset and at least one updated display adaptation; and
provide the updated one or more display elements to the display,
  wherein the set of instructions includes instructions for displaying the at least one updated content asset and applying the at least one updated display adaptation in order to alter the at least one updated content asset based on the updated position data.

18. The non-transitory computer-readable medium of claim 16, wherein the one or more instructions further cause the system to:
select an updated one or more display elements from the set of display elements based on a threshold condition being satisfied,
  wherein the selected updated one or more display elements include at least one updated content asset and at least one updated display adaptation; and
provide the updated one or more display elements to the display,
  wherein the set of instructions includes instructions for displaying the at least one updated content asset and applying the at least one updated display adaptation to alter the at least updated one content asset based on the threshold condition being satisfied.

19. The non-transitory computer-readable medium of claim 16, wherein the position data is received from at least one detection component.

20. The non-transitory computer-readable medium of claim 16, wherein the one or more instructions further cause the system to:
receive detected user device identification data of a user device associated with the user;
obtain a set of user profiles,
  wherein each user profile of the set of user profiles is associated with user device identification data; and
determine a user profile from the set of user profiles based on a comparison between the detected user device identification data and the user device identification data associated with the user profile,
  wherein the decision information is further associated with the determined user profile.

* * * * *